(12) United States Patent
Babin (10) Patent No.: US 7,175,419 B2
(45) Date of Patent: Feb. 13, 2007

(54) HOT RUNNER CO-INJECTION NOZZLE

(75) Inventor: Denis Babin, Georgetown (CA)

(73) Assignee: Mold-masters Limited, Georgetown (CA)

( * ) Notice: Subject to any disclaimer, the term of this patent is extended or adjusted under 35 U.S.C. 154(b) by 274 days.

(21) Appl. No.: 10/725,538

(22) Filed: Dec. 3, 2003

(65) Prior Publication Data

US 2004/0109916 A1 Jun. 10, 2004

Related U.S. Application Data

(60) Provisional application No. 60/430,358, filed on Dec. 3, 2002.

(51) Int. Cl.
*B29C 45/23* (2006.01)
(52) U.S. Cl. ...................... 425/564; 425/572
(58) Field of Classification Search .............. 425/562, 425/563, 564, 565, 572
See application file for complete search history.

(56) References Cited

U.S. PATENT DOCUMENTS

| | | | |
|---|---|---|---|
| 3,374,502 A | 3/1968 | Lazzara | |
| 3,390,433 A | 7/1968 | Barnett et al. | |
| 3,417,433 A | 12/1968 | Teraoka | |
| 3,819,313 A | 6/1974 | Josephsen et al. | |
| 3,861,841 A | 1/1975 | Hanning | |
| 4,279,582 A | 7/1981 | Osuna-Diaz | |
| 4,380,426 A | 4/1983 | Wiles et al. | |
| 4,420,452 A | 12/1983 | Van Dalen et al. | |
| 4,657,496 A | 4/1987 | Ozeki et al. | |
| 4,717,324 A | 1/1988 | Schad et al. | |
| 4,723,898 A | 2/1988 | Tsutsumi | |
| 4,863,369 A | 9/1989 | Schad et al. | |
| 5,028,226 A | 7/1991 | De'ath et al. | |
| 5,043,129 A | 8/1991 | Sorensen | |
| 5,112,212 A | 5/1992 | Akselrud et al. | |
| 5,141,696 A | 8/1992 | Osuna-Diaz | |
| 5,143,733 A | 9/1992 | Von Buren et al. | |
| 5,149,547 A | 9/1992 | Gill | |

(Continued)

FOREIGN PATENT DOCUMENTS

CN 2527427 Y 12/2002

(Continued)

OTHER PUBLICATIONS

Copy of European Search Report mailed Mar. 30, 2004 for EP29422MATLoe, 5 pages.

(Continued)

*Primary Examiner*—Tim Heitbrink
(74) *Attorney, Agent, or Firm*—Medler Ferro PLLC (57) ABSTRACT

This invention teaches a hot runner injection molding apparatus for co-injecting at least two different materials into a mold cavity. A pin valve gated hot runner nozzle includes separate melt channels for each material and a melt chamber for accurately metering one of the materials. The melt chamber is in communication with an injection piston. The controlled movement of the valve pin and of the injection piston insures that the desired amount of a first and at least a second material is injected into the mold cavity. Depending of the composition and the processing window of the materials, the co-injection hot runner nozzle is in communication with either a single or multiple manifolds.

12 Claims, 6 Drawing Sheets

U.S. PATENT DOCUMENTS

| | | |
|---|---|---|
| 5,192,555 A | 3/1993 | Arnott |
| 5,200,207 A | 4/1993 | Akselrud et al. |
| 5,200,527 A | 4/1993 | Griffiths et al. |
| 5,223,275 A | 6/1993 | Gellert |
| 5,238,378 A | 8/1993 | Gellert |
| 5,260,012 A | 11/1993 | Arnott |
| 5,389,315 A | 2/1995 | Yabushita |
| 5,454,995 A | 10/1995 | Rusconi et al. |
| 5,478,520 A | 12/1995 | Kasai et al. |
| 5,556,582 A | 9/1996 | Kazmer |
| 5,582,851 A | 12/1996 | Hofstetter et al. |
| 5,605,707 A | 2/1997 | Ibar |
| 5,650,178 A | 7/1997 | Bemis et al. |
| 5,762,855 A | 6/1998 | Betters et al. |
| 5,766,654 A | 6/1998 | Groleau |
| 5,773,038 A | 6/1998 | Hettinga |
| 5,814,358 A | 9/1998 | Bock |
| 5,849,236 A | 12/1998 | Tatham |
| 5,891,381 A | 4/1999 | Bemis et al. |
| 5,894,023 A | 4/1999 | Schramm et al. |
| 5,919,492 A | 7/1999 | Tarr et al. |
| 5,935,614 A | 8/1999 | Blank et al. |
| 6,045,740 A | 4/2000 | Gorlich |
| 6,062,840 A | 5/2000 | Lee et al. |
| 6,074,191 A * | 6/2000 | Gellert et al. ............... 425/572 |
| 6,090,318 A | 7/2000 | Bader et al. |
| 6,099,767 A | 8/2000 | Tarr et al. |
| 6,228,309 B1 | 5/2001 | Jones et al. |
| 6,245,278 B1 | 6/2001 | Lausenhammer et al. |
| 6,254,377 B1 | 7/2001 | Kazmer et al. |
| 6,261,075 B1 | 7/2001 | Lee et al. |
| 6,287,107 B1 | 9/2001 | Kazmer et al. |
| 6,294,122 B1 | 9/2001 | Moss et al. |
| 6,309,208 B1 | 10/2001 | Kazmer et al. |
| 6,343,921 B1 | 2/2002 | Kazmer et al. |
| 6,343,922 B1 | 2/2002 | Kazmer et al. |
| 6,361,300 B1 | 3/2002 | Kazmer et al. |
| 6,464,909 B1 | 10/2002 | Kazmer et al. |
| 6,558,603 B2 | 5/2003 | Wobbe et al. |
| 6,683,283 B2 | 1/2004 | Schmidt |
| 6,699,422 B1 | 3/2004 | Stemke |
| 6,884,061 B2 | 4/2005 | Okamura et al. |
| 2002/0071888 A1 | 6/2002 | Bouti |
| 2002/0121713 A1 | 9/2002 | Moss et al. |
| 2003/0170340 A1 | 9/2003 | Sicilla et al. |
| 2003/0224086 A1 | 12/2003 | Olaru |
| 2004/0109916 A1 | 6/2004 | Babin |
| 2005/0079242 A1 | 4/2005 | Schmidt |

FOREIGN PATENT DOCUMENTS

| | | |
|---|---|---|
| DE | 19802048 A1 | 7/1999 |
| EP | 0 393 389 | 10/1990 |
| EP | 0 624 449 A2 | 11/1994 |
| EP | 0 901 896 A2 | 3/1999 |
| EP | 0 967 063 A1 | 12/1999 |
| EP | 1 013 395 A1 | 6/2000 |
| JP | 58-142833 | 8/1983 |
| JP | 60-212321 | 10/1985 |
| JP | 63-166511 | 7/1988 |
| JP | 4-348923 | 12/1992 |
| JP | 5-104580 | 4/1993 |
| JP | 6-8285 | 1/1994 |
| JP | 6-166072 | 6/1994 |
| JP | 7-40400 | 2/1995 |
| JP | 7-266379 | 10/1995 |
| JP | 9-1600 | 1/1997 |
| JP | 9-39033 | 2/1997 |
| JP | 9-141688 | 6/1997 |
| JP | 11-5232 | 1/1999 |
| WO | WO 98/56564 | 12/1998 |
| WO | WO 99/54109 | 10/1999 |
| WO | WO 00/35655 | 6/2000 |
| WO | WO 01/21377 | 3/2001 |
| WO | WO 01/36174 | 5/2001 |
| WO | WO 01/60580 | 8/2001 |
| WO | WO 02/36324 | 5/2002 |

OTHER PUBLICATIONS

"The Five Step Process"—An Industry Standard Process for Diagnosing and Isolating Cavity Variations in Multi-Cavity Injection Molds, Beaumont Runner Technologies, Inc. http://www.meltflipper.com/fivestep/fivestep.html; dated: Mar. 15, 2004.

"Micromolding Sizing Up the Challenges" by Mikell Knights, Senior Editor, Plastics Technology, http://www.plasticstechnology.com; dated: Nov. 23, 2001.

Sensors and Data Acquisition for Injection Molding Cavity Pressure and Temperature Sensor and DataFlow; Kistler Japan Co., Ltd.; http://www.Kistler.co.lp; 2003.

Tooling Innovations for Thermoset Molding; Nunnery et al.; www.bulkmolding.com/technical-papers/tooling thermosetmolding.pdf; 2003.

Ewikon Hotrunner Systems for large parts; May 2000.

SG-Link™ Wireless Strain Gauge System, www.microstrain.com; dated: Apr. 29, 2004.

"Pressure and Temperature Control of Multicavity Injection Mold with Hydraulic Valve Gate Hot Mold System," No. 301, p. 333, Research Disclosure, Kenneth Mason Publications, Hampshire, GB, May 1989, ISSN: 0374-4353.

* cited by examiner

HOT RUNNER CO-INJECTION NOZZLE

CROSS-REFERENCE TO RELATED APPLICATIONS

This application claims the benefit under 35 U.S.C. § 119(e) of provisional application No. 60/430,358, filed Dec. 3, 2002, which is incorporated by reference in its entirety herein.

FIELD OF THE INVENTION

The present invention relates generally to a co-injection molding apparatus, and in particular to a metering device for a hot runner nozzle, which injects a predetermined quantity of melt into a mold cavity. The present invention is applicable to molding applications in which two or more materials are injected simultaneously and/or sequentially into a single mold cavity.

BACKGROUND OF THE INVENTION

In a co-injection molding apparatus, two or more molten materials are injected into the same mold cavity, either simultaneously or in sequence using a single or a plurality of injection manifolds. A typical co-injection molding apparatus comprises first and second injection manifolds that receive pressurized melt streams from respective molten material sources. Each manifold distributes a melt stream of molten material to a plurality of nozzles. The two melt streams are forced through separate channels in the nozzle and into a plurality of mold cavities. The two melt streams may enter the mold cavities simultaneously or, alternatively, the two melt streams may enter in sequence. A combination in which the melt streams first enter the mold cavities in sequence and then simultaneously may also be used. Once both materials have been deposited in the mold cavities, the melt is cooled in the mold cavities and the molded parts are released so that another cycle can begin.

Co-injection is used for example to produce food packaging products having a predetermined and very accurate amount of an inner material, such as for example oxygen barriers or having a percentage of recycled, or post-consumer material or having a percentage of a different colored material.

In general, the amount of the inner material that enters the mold cavity after injecting the first outer material must be very precise in order to produce a quality molded part. In the case of a multi cavity molding system, the quantity of the inner material must also be the same in each molded material. This inner material can be a barrier material.

It is desirable to use as much recycled material in a molded part as possible without exceeding a maximum allowable amount. As such, the amount must be measured precisely.

In order to ensure that the molded product has a consistent appearance, the amount of colored material that enters the mold cavity must be precisely measured.

In a co-injection molding apparatus, the volume of the inner or core material, such as a barrier, recycled or colored material transferred in each shot is very important. Several devices have been developed to control the volume of melt that is injected into a multi-material mold cavity, however, these devices tend to be inaccurate, difficult to operate, complex and costly to manufacture.

U.S. Pat. No. 5,223,275 to Gellert discloses a co-injection molding apparatus having two manifolds. Two separate channels are provided in a plurality of nozzles to receive material from the respective manifolds. The volumes of the first and second materials flowing into a mold cavity are controlled by the machine nozzle and therefore are not precise.

U.S. Pat. No. 5,112,212 to Akselrud et al. discloses a shooting pot, which is used as a metering device, for use in a co-injection molding apparatus. The shooting pots are remotely located with respect to the hot runner nozzle and are used to control the timing and the volume of one of the two molten materials injected into the cavity. The shooting pot includes a piston that is axially movable within a cylinder to force molten material from the cylinder into a nozzle, which leads to a mold cavity. The cylinder includes an inlet that delivers melt from a melt source to a reservoir, which is located in a lower end of the piston. The piston is rotatable to move the reservoir out of communication with the inlet to seal it off so that when the piston is lowered, a known volume of melt is forced into the mold cavity.

Other shooting pot arrangements for use in co-injection are shown in U.S. Pat. Nos. 5,143,733 and 5,200,207 and European Patent Application No. EP 0 624 449.

A disadvantage of these manifold shooting pots is that they are remotely located from the nozzle and the mold cavity and this makes the whole apparatus more space consuming. Also these shooting pots located in the manifold or adjacent the manifold include separate mechanisms located in the manifold that open and close the access of the metered molten material to the shooting pot and these mechanisms are space consuming, difficult to manufacture and hard to synchronize in a multi-cavity mold. By using these known co-injection molding devices, the measured volume of inner melt injected from the shooting pots may vary from one molding cycle to the next and from one cavity to another. This occurs because there is a large volume of melt that is located between the shooting pot and the mold cavity, i.e., the melt in the nozzle, the melt in the manifold channel and the melt in the shooting pot. This large volume of quasi metered melt introduces several process variables. Minor deviations in temperature or pressure, for example, may result in significant variations of the known volume. The sizable distance between the shooting pot and the mold cavity further causes the melt to have a long residence time outside of the nozzle between the injection of one article to the next. This results in molded parts that are not of the highest quality because the temperature of the melt coming from the shooting pot may be either under heated or over heated.

It is therefore an object of the present invention to provide a metering device for a nozzle of a co-injection molding apparatus, which obviates or mitigates at least one of the above disadvantages.

SUMMARY OF THE INVENTION

The present invention generally provides at least one manifold for delivering at least two different materials to at least one mold cavity through a single or a plurality of hot runner nozzles. Each hot runner nozzle includes a metering device that is used to deliver a predetermined and accurate amount of a molten material into each mold cavity.

According to one aspect of the present invention there is provided an injection molding apparatus comprising:

a first manifold having a first manifold channel for receiving a first melt stream of moldable material under pressure, the first manifold channel having a first outlet for delivering the first melt stream to a nozzle channel of a nozzle;

a second manifold having a second manifold channel for receiving a second melt stream of moldable material under pressure, the second manifold channel having a second outlet for delivering the second melt stream to a second nozzle channel of a nozzle;

a mold cavity receiving the first melt stream and the second melt stream from the nozzle, the first nozzle channel and second nozzle channel communicating with the mold cavity through a mold gate;

a gating mechanism for selectively enabling communication between the first nozzle channel, the second nozzle channel and the mold gate;

an injection piston extending through a channel located between the first outlet of the manifold and the first nozzle channel of the nozzle, the injection piston being slidable through the channel and having an outer wall for abutting an inner wall of the nozzle channel, the injection piston being movable from a retracted position to an extended position to force melt towards the mold cavity;

wherein movement of the injection piston towards the extended position forces melt located in a melt chamber of the nozzle channel to flow into the mold cavity.

According to another aspect of the present invention there is provided a method of forming a molded product from at least two different materials comprising:

injecting a first material into a mold cavity, the mold cavity being in communication with a hot runner nozzle to receive the first material under pressure therefrom, a machine injection unit providing the first material under pressure to the hot runner nozzle through a manifold; and injecting a second material into the mold cavity, the mold cavity being in communication with a melt chamber that is located at least partially in the hot runner nozzle, an injection piston forcing the second material from the melt chamber into the mold cavity.

According to yet another aspect of the present invention there is provided an injection molding apparatus comprising:

a hot runner injection nozzle having a first melt channel and a second melt channel;

a valve gating mechanism to control the flow of a first molten material and a second molten material through a mold gate;

a melt chamber located in the hot runner injection nozzle; and an injection piston in communication with the hot runner injection nozzle to force a metered amount of molten material into the mold cavity.

The present invention provides an advantage for multi-material molding in that a metered quantity of a melt is delivered accurately and consistently to a single or a plurality of mold cavities via a melt chamber located in a hot runner nozzle. The metered amount of melt is delivered by actuating an injection piston located in fluid communication with the nozzle.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENT

Figure 1:
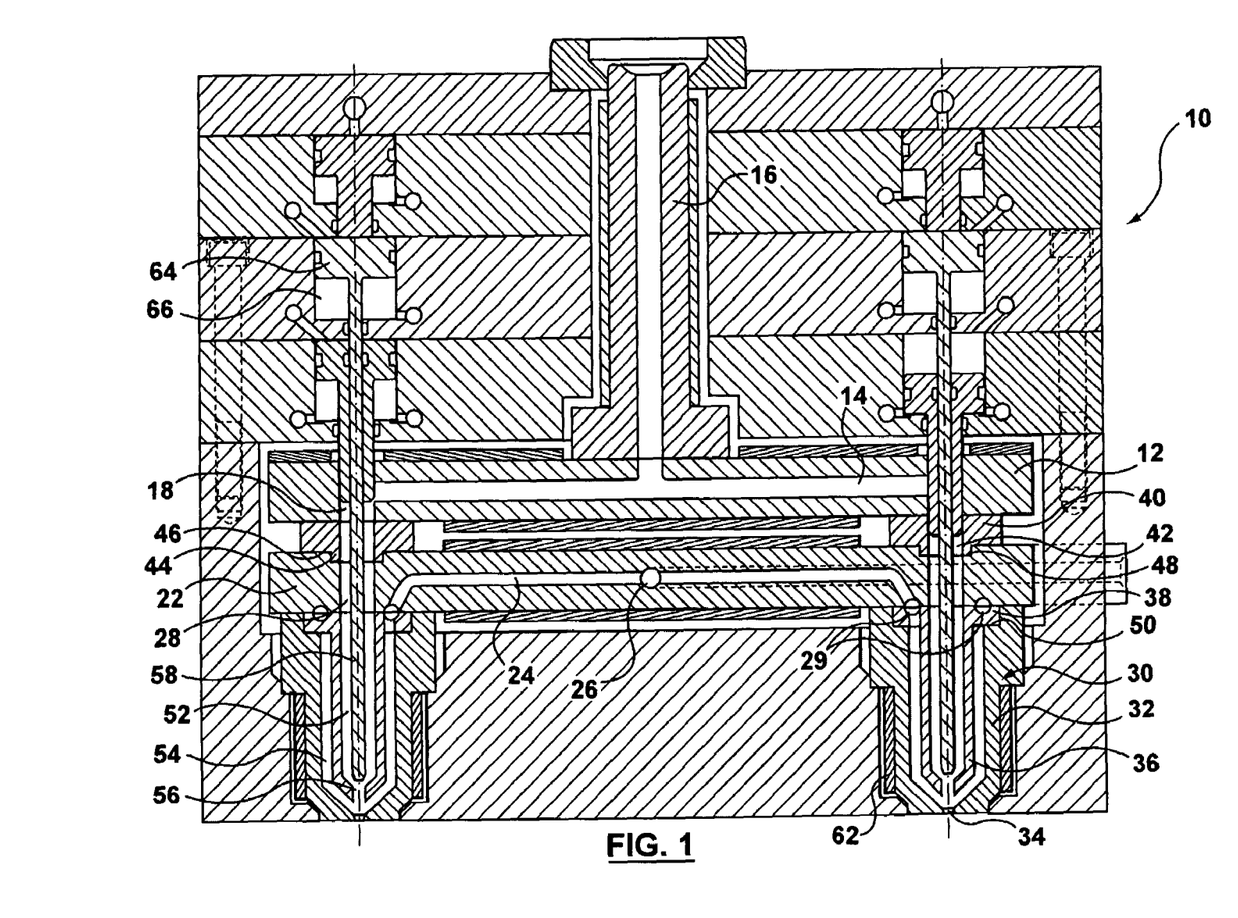
FIG. 1 is a side sectional view of a co-injection molding apparatus according to the present invention.

Referring to FIG. 1, portions of a co-injection molding apparatus are generally shown at 10. The co-injection molding apparatus 10 includes a first manifold 12 having a first manifold melt channel 14 for receiving a first melt stream of moldable material under pressure from a first manifold bushing 16. The first manifold bushing 16 is in communication with a first machine nozzle (not shown). Bores 18 extend through the first manifold 12 at distal ends of the first manifold melt channel 14. The bores 18 are in communication with the first melt channel 14 and extend generally perpendicular thereto.

The injection molding apparatus 10 further comprises a second manifold 22 having a second manifold melt channel 24 for receiving a second melt stream of moldable material under pressure through an inlet 26 from a second manifold bushing (not shown). Bores 28 extend through the second manifold 22 at distal ends of the second manifold 22 and extend generally perpendicular thereto. The bores 28 of the second manifold 22 are aligned with bores 18 of the first manifold channel 12. The second melt stream exits the second manifold 22 through outlets 29.

Spacers 40 are located between a lower surface of the first manifold 12 and an upper surface of the second manifold 22. Each spacer 40 includes a bore 42 that extends therethrough. The bore 42 is aligned with the bores 18 and 28 of the first and second manifolds 12 and 22, respectively. Each spacer 40 further includes a flange 44 that projects outwardly from a lower surface 46 thereof. The flange 44 is seated in a recess 48 provided in the upper surface of the second manifold 22 to locate the spacer 40 relative to the second manifold 22.

Hot runner nozzles 30 are coupled to a lower surface of the second manifold 22. Each nozzle 30 includes a nozzle body 32 having a mold gate 34 located adjacent a tip thereof. The mold gates 34 are openable to allow delivery of melt to respective mold cavities 60 (shown in FIG. 2).

Each nozzle 30 further includes an inner nozzle divider 36 having a nozzle flange 38. The nozzle flange 38 is supported by a shoulder 50, which is formed in an upper end of the nozzle body 32. The inner nozzle divider 36 includes a first nozzle channel gate 56, which is spaced from the tip of the nozzle 30. The inner nozzle divider 36 separates a first nozzle channel 52 from a second nozzle channel 54. The first nozzle channel 52 is aligned with bores 18, 42 and 28 of the first manifold 12, the spacer 40 and the second manifold 22, respectively. The first nozzle channel 52 receives the first melt stream from the first manifold 12. The second nozzle channel 54 is in communication with the annular outlet 29 of the second manifold 22 and receives the second melt stream therefrom. The second nozzle channel 54 generally surrounds the first nozzle channel 52.

Figure 2:
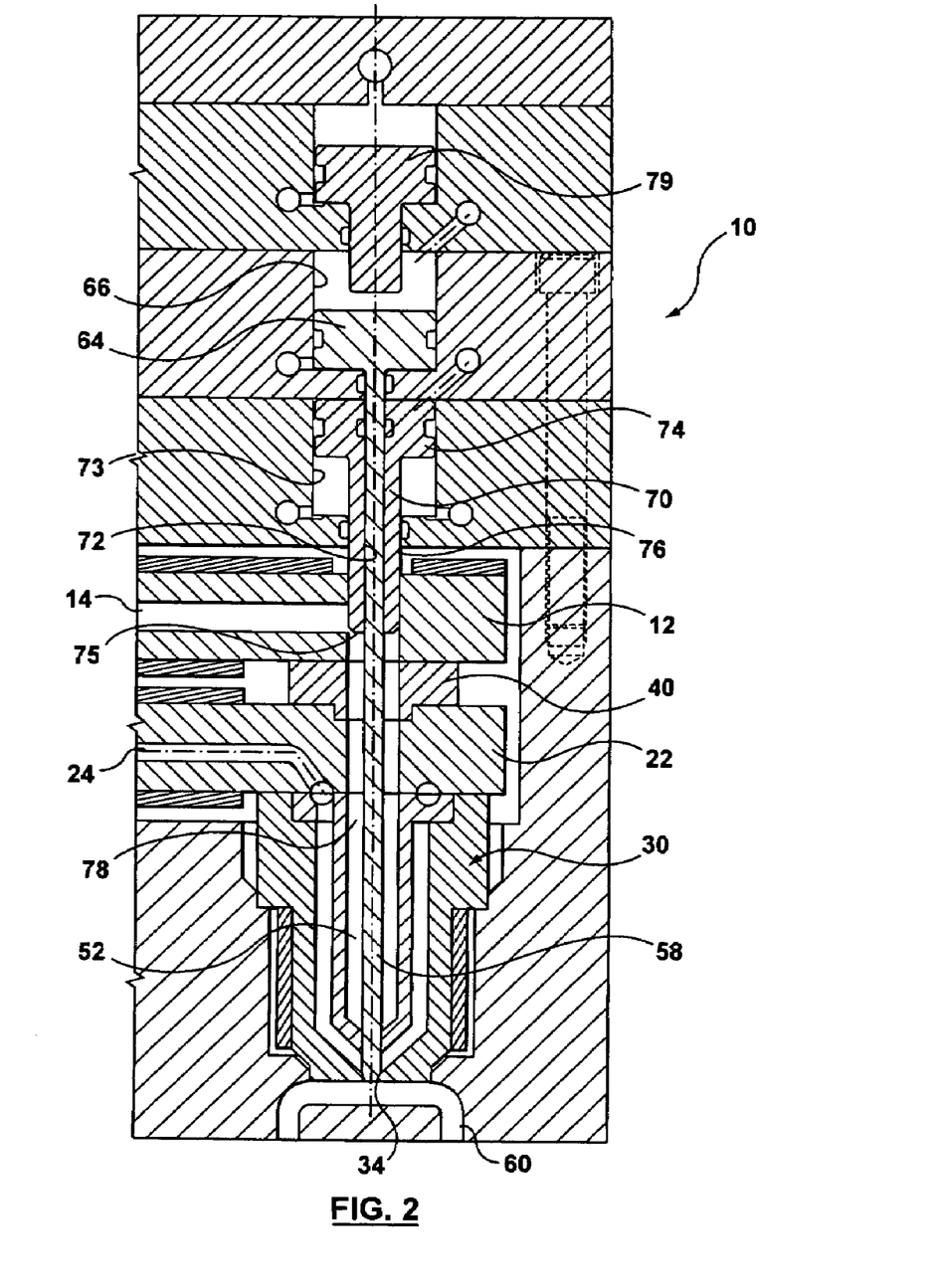
FIG. 2 is a side sectional view of a portion of the co-injection molding apparatus of FIG. 1 including a mold cavity, the co-injection molding apparatus in a closed position.

Any number of nozzles 30 can be used to feed either a single or a plurality of mold cavities 60 (shown in FIG. 2). The mold cavities 60 may be of the same size and shape or they may differ. Manifold heaters (not shown) and nozzle heaters 62 maintain the melt stream at a desired temperature and cooling channels (not shown) facilitate cooling of the mold cavities 60.

A valve pin 58 extends through the bores 18, 42 and 28 of the first manifold 12, the spacer 40 and the second manifold 22, respectively, and the first nozzle channel 52. The valve pin 58 is generally a gating mechanism that is pneumatically driven by a valve pin head 64, which is slidable within a cylinder 66. The valve pin 58 has three positions: open, partially open and closed.

Referring to FIG. 2, the valve pin 58 is shown in the closed position. In this position, the valve pin 58 engages the mold gate 34 to block melt from flowing from the nozzle 30 into the mold cavity 60. The valve pin head 64 further communicates with a stroke limiting device 79. The stroke limiting device has two positions that control the location of the valve pin 58 with respect to the first nozzle channel gate 56.

Figure 3:
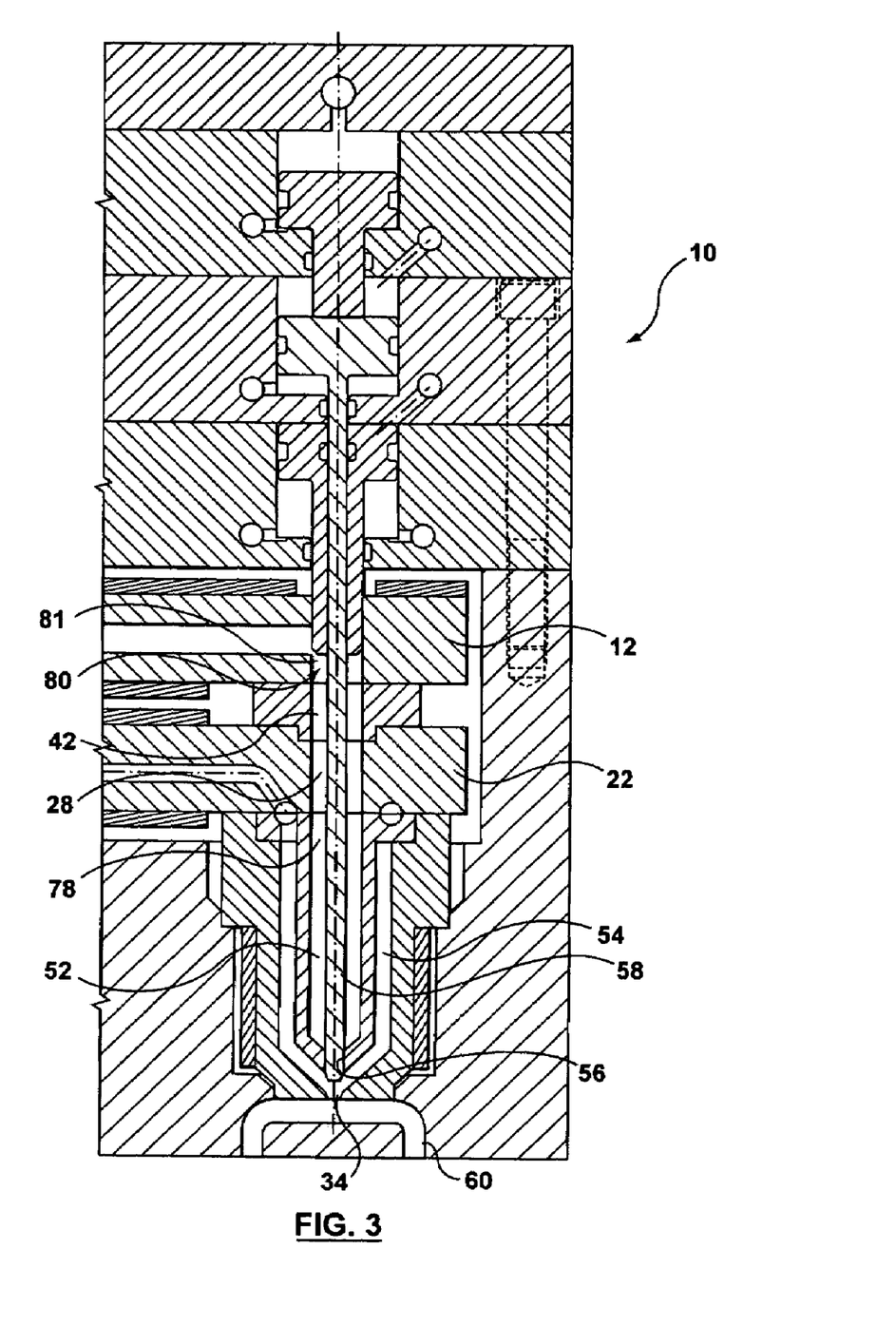
FIG. 3 is a side sectional view of a portion of the co-injection apparatus of FIG. 1 in a first molding position.

Referring to FIG. 3, the valve pin 58 is shown in the partially open position. In this position, the valve pin 58 extends through the first nozzle channel gate 56 to block the first melt stream from the first nozzle channel 52 to the mold cavity 60. Because the valve pin 58 is not in contact with the mold gate 34, the second melt stream is able to enter the mold cavity 60.

Figure 4:
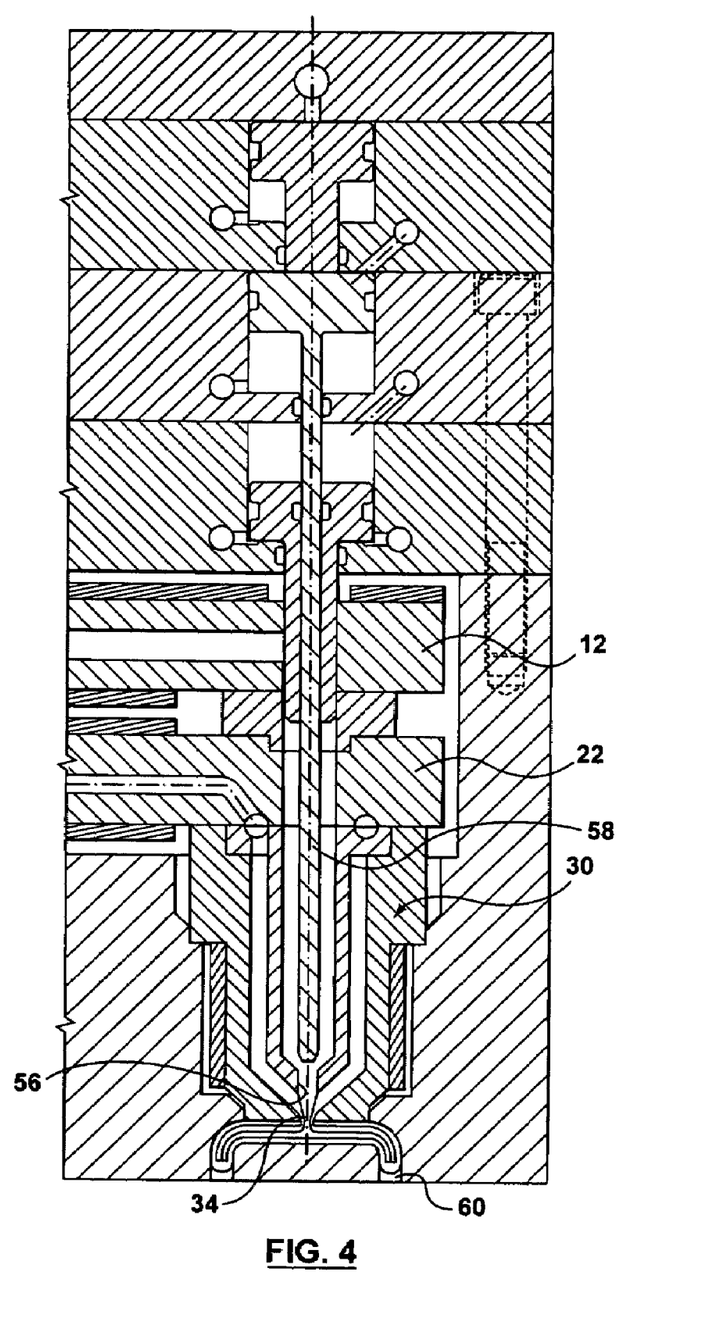
FIG. 4 is a side sectional view of a portion of the co-injection apparatus of FIG. 1 in a second molding position.

Referring to FIG. 4, the valve pin 58 is in the open position. In this position, both the first melt stream and the second melt stream are able to flow from the nozzle 30 into the mold cavity 60.

The valve pin 58 is not limited to being driven pneumatically, it may be also driven hydraulically or by any other suitable means, including electrical and electromagnetic motors. In addition, it will be appreciated that the valve pin 58 may be replaced with another suitable gating system.

Referring to FIGS. 2–5, a hot runner metering device for the first or inner melt material is disclosed in more detail in the form of a hot runner injection piston 70 and a melt chamber 78. The injection piston 70 is slidable through an injection manifold channel 80, which communicates with the bore 42 of the spacer 40, the bore 28 of the second manifold 22 and the first nozzle channel 52. The injection piston 70 is pneumatically driven by a piston head 74 that is slidable in a second cylinder 73. The injection piston 70 is not limited to being driven pneumatically, it may be also driven hydraulically or by any other suitable means, including electrical and electromagnetic motors.

The injection piston 70 includes a central bore 72 which allows the valve pin 58 to slide through the injection piston 70 into the open, partially open and closed positions that have been previously described. The injection piston 70 includes an outer surface 76, which selectively blocks the communication between the first manifold channel 14 and the injection channel 80. The clearance 81 between the channel 14 and the channel 80 is defined by the position of the injection piston 70. The metered melt chamber 78 has a constant volume which is defined by the amount of melt located in the channels 52, 28 and 42 when the injection piston 70 closes the communication between channel 80 and channel 14.

Figure 5:
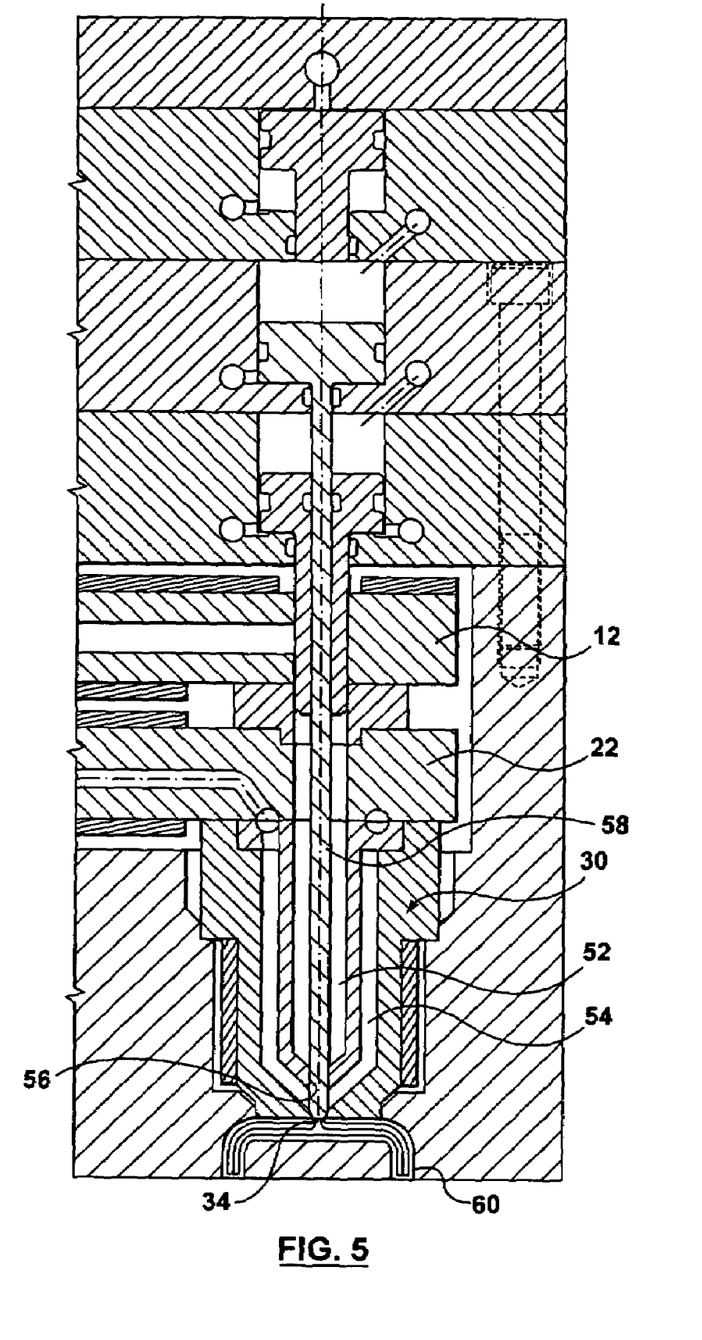
FIG. 5 is a side sectional view of a portion of the co-injection apparatus of FIG. 1 in the closed position of FIG. 2 with a completed part in the mold cavity.

The injection piston 70 is movable from a retracted position, which is shown in FIGS. 2 and 3, to an extended position, which is shown in FIGS. 4 and 5. In the retracted position, melt flows from the first manifold channel 14 into the injection channel 80 via clearance 81. In the extended position, communication between the first manifold channel 14 and the injection channel 80 is blocked and the melt chamber 78 (shown in FIG. 4 and FIG. 5) is formed.

When the injection piston 70 is in the retracted position and the valve pin 58 is in either the closed or partially open positions, the melt chamber 78 (shown in FIGS. 4 and 5) is opened and accessible to be filled with the first or inner melt in the injection channel 80 between a forward end 75 of the piston body 74 and the first nozzle channel gate 56. The volume of melt in the melt chamber is known. Because the stroke of the injection piston 70 from the retracted position to the extended position is known and constant among each nozzle 30, the volume of melt injected into the mold cavity 60 from the injection channel 80 is also known and is constant from one nozzle to another and from one injection cycle to the next. The close proximity of the known volume of melt to be injected and the mold cavity 60 reduces the variability experienced by prior art devices In operation, the first inner or core pressurized melt stream flows through the first manifold bushing 16 to the first manifold channel 14 of the first manifold 12 and into the first nozzle channel 52 which is closed by valve pin 58 to form the melt chamber 78 of a known size. The second outer or skin pressurized melt stream flows through the second manifold bushing (not shown) to the second manifold channel 24 of the second manifold 22 and into the second nozzle channel 54. Referring to FIG. 2, the co-injection molding cycle may begin according to an embodiment of this invention with both the mold gate 34 and the first nozzle channel gate 56 in the closed position and the injection piston 70 in the retracted position.

Referring to FIG. 3, the valve pin 58 is retracted from the closed position of FIG. 2 into the partially open position to allow the second melt stream to flow from the second nozzle channel 54 into the mold cavity 60. The position of the valve pin 58 is blocked by the stroke limiter 79, which is in the forward position. According to an embodiment of the current invention, following the injection of a certain volume of the second melt into the mold cavity 60, the melt chamber 78 is filled with the first material and then the injection piston 70 is moved into an intermediate position to block the manifold melt channel 14 while keeping the valve pin 58 in the closed position of the first nozzle channel gate 56. The movement of the injection piston 70 to block the communication between the manifold melt channel 14 and the bore 42 creates the metered volume of the inner or core second material which is located mostly in the first nozzle channel 52 and above it to form the melt chamber 78. The volume of the melt chamber 78 is always the same from one shot to the next and from one nozzle to the others. During the next injection step, the valve pin 58 is moved into the open position of FIG. 4. As the valve pin 58 moves toward the open position, the injection piston 70 is further extended so that melt flows simultaneously from both the first and second nozzle channels 52, 54 into the mold cavity 60. As shown, the first melt stream generally flows inside the second melt stream so that the barrier, colored or post-consumer layer is generally centrally disposed within the molded product. The volume of the core or inner melt that can be a barrier, colored or post-consumer layer is predetermined so that the quantity of these substances that is injected into each product is controlled.

Referring to FIG. 5, the valve pin 58 is returned to the closed position once the predetermined volume of first melt has been injected into the mold cavity 60. The mold cavity 60 is then cooled and the molded product is released from the mold cavity 60. From the position of FIG. 5, the injection piston 70 is returned to the retracted position of FIG. 2 and the injection molding cycle is repeated. According to another embodiment of the current invention, the second or the inner or the core material can be injected from the melt chamber 78 in a different manner for certain co-injection applications where there is a need for a faster injection cycle or for a simpler controller of the movements of the injection piston 70 and the valve pin 58. In this case, shown in FIG. 3, after the second or the skin material is injected in the mold cavity 60 and the first or core material is injected in the first nozzle channel 52, the valve pin 58 is moved to the fully retracted position to open the first nozzle channel gate 56 and, simultaneously the injection piston 70 is moved gradually to a fully extended position to inject the first material from the melt chamber 78 into the mold cavity 60.

As will be appreciated, the injection molding apparatus 10 described herein ensures that the volume of melt injected from the first nozzle channel 52 and the melt chamber 78 into the mold cavity 60 is equal for each mold cavity 60 and is constant for every cycle.

Because a manifold typically supports more than one nozzle, it will be appreciated by a person skilled in the art that the movement of the individual pistons of each nozzle may be staggered so that the pressure from the machine nozzle can remain constant.

In a further embodiment, the mold cavities 60 are of different sizes. In order to properly fill each mold cavity 60, the melt chamber 78 of each nozzle 30 must be sized to accommodate the correct volume of melt. The nozzles 30 associated with each mold cavity 60 are identical, however, each injection piston 70 must be sized accordingly.

Figure 6:
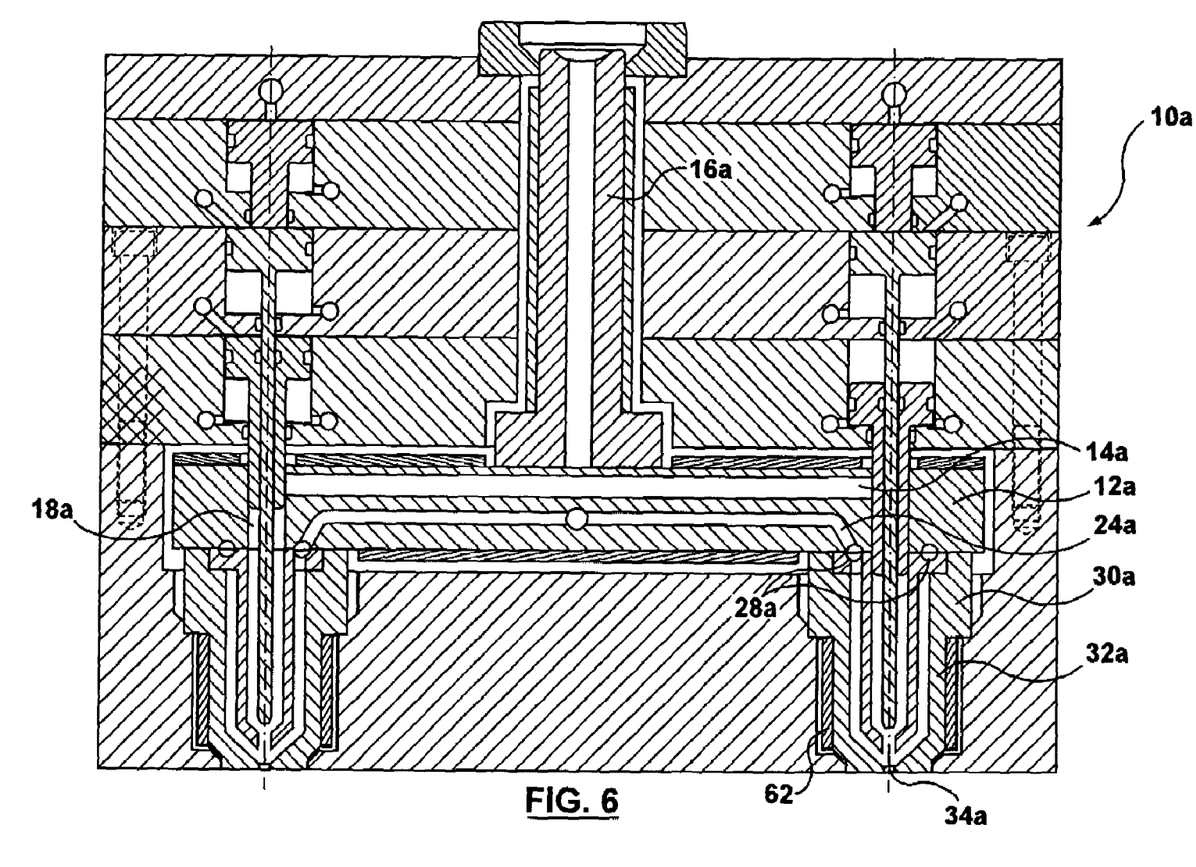
FIG. 6 is a side sectional view of an embodiment of the present invention showing a single manifold to guide at least two molten materials towards a single nozzle.

Referring to FIG. 6, another embodiment of a co-injection molding apparatus 10a is shown, in which like reference numerals have been used to denote like parts. The co-injection molding apparatus 10a includes a manifold 12a having a first manifold melt channel 14a and a second manifold channel 24a extending therethrough. The first manifold melt channel 14a receives a first melt stream of moldable material under pressure from a first manifold bushing 16a, which is in communication with a first machine nozzle (not shown). Bores 18a extend through the manifold 12a at distal ends of the first manifold melt channel 14a. The bores 18a are in communication with the first melt channel 14a for receiving the first melt stream therefrom.

The second manifold melt channel 24a receives a second melt stream of moldable material under pressure from a second manifold bushing (not shown). The second melt stream exits the manifold 12a through outlets 29a.

Hot runner nozzles 30a are coupled to a lower surface of the manifold 12a. Each nozzle 30a includes a nozzle body 32a having a mold gate 34a located adjacent a tip thereof. The mold gates 34a are openable to allow delivery of melt to respective mold cavities. The nozzles 30a and the remaining components are similar to those of FIG. 1 and therefore will not be described further here.

The co-injection molding apparatus 10a of FIG. 6 operates in a similar manner to the co-injection molding apparatus of FIG. 1, with the exception that the first and second manifolds have been replaced with a single manifold 12a.

Although a preferred embodiment of the present invention has been described, those of skill in the art will appreciate that variations and modifications may be made without departing from the spirit and scope thereof as defined by the appended claims.

We claim:

1. An injection molding apparatus comprising:
   a first manifold having a first manifold channel for receiving a first melt stream of moldable material under pressure, said first manifold channel having a first outlet for delivering the first melt stream to a first nozzle channel of a nozzle;
   a second manifold having a second manifold channel for receiving a second melt stream of moldable material under pressure, said second manifold channel having a second outlet for delivering the second melt stream to a second nozzle channel of said nozzle;
   a mold cavity receiving said first melt stream and said second melt stream from said nozzle, said first nozzle channel and second nozzle channel communicating with said mold cavity through a mold gate;
   a gating mechanism for selectively enabling communication between said first nozzle channel, said second nozzle channel and said mold gate;
   an injection piston extending through an injection channel located between said first outlet of said first manifold channel and said first nozzle channel of said nozzle, said injection piston being slidable through said injection channel and having an outer wall for abutting an inner wall of said injection channel, said injection piston being movable from a retracted position enabling communication between said first outlet of said first manifold channel to an extended position blocking said first outlet of said first manifold channel;
   wherein movement of said injection piston towards said extended position forces melt located in a melt chamber of said first nozzle channel to flow into said mold cavity.

2. The injection molding apparatus of claim 1, wherein said melt chamber is defined by said first nozzle channel at one end and a forward end of said injection piston at an opposite end.

3. A method of forming a molded product from at least two different materials comprising the steps of:
   injecting a first material into a mold cavity via a valve gated nozzle having a first melt channel;
   injecting a second material into a melt chamber located at least partially in a second melt channel of said valve gated nozzle;
   moving an injection piston into a position to block the second material from entering the melt chamber while the second material is blocked from entering the mold cavity;
   opening communication between the second melt channel and the mold cavity and further extending the injection piston so as to inject said second material from said melt chamber into said mold cavity.

4. An injection molding apparatus comprising:
   a manifold having a first manifold channel for receiving a first melt stream of moldable material under pressure and a second manifold channel for receiving a second melt stream of moldable material under pressure, said first melt stream exiting said manifold through a first manifold outlet and said second melt stream exiting said manifold through a second manifold outlet;
   a first nozzle channel extending through a nozzle for receiving said first melt stream from said first manifold outlet;
   a second nozzle channel extending through said nozzle for receiving said second melt stream from said second manifold outlet;

a mold cavity for selectively receiving said first melt stream and said second melt stream from said nozzle, said first nozzle channel and second nozzle channel communicating with said mold cavity through a mold gate;

an injection piston movable within at least a portion of said first nozzle channel, said injection piston being slidable between a retracted position enabling communication between said first manifold outlet and said first nozzle channel and an extended position blocking said first manifold outlet;

wherein movement of said injection piston towards said extended position forces melt located in a melt chamber of said first nozzle channel to flow into said mold cavity.

5. The injection molding apparatus of claim 4, further comprising a valve pin, said valve pin being slidable through said first nozzle channel and at least a portion of said second nozzle channel, said valve pin being movable between an open position, a partially open position in which communication between said first nozzle channel and said second nozzle channel is blocked, and a closed position in which said valve pin engages said mold gate.

6. The injection molding apparatus of claim 5, wherein said first melt channel is surrounded by said second melt channel.

7. The injection molding apparatus of claim 1, wherein said first melt channel is surrounded by said second melt channel.

8. The injection molding apparatus of claim 7, wherein said gating mechanism includes a valve pin, said valve pin being slidable through said first nozzle channel and at least a portion of said second nozzle channel, said valve pin being movable between an open position wherein melt from both of said first nozzle channel and said second nozzle channel flows into said mold cavity, a partially open position wherein communication between said first nozzle channel and said second nozzle channel is blocked, and a closed position in which said valve pin engages said mold gate to block communication between both of said first nozzle channel and said second nozzle channel and said mold cavity.

9. The injection molding apparatus of claim 1, wherein said gating mechanism includes a valve pin and said valve pin is slidable relative to said injection piston.

10. The injection molding apparatus of claim 9, wherein said valve pin is slidable through a bore in said injection piston.

11. The injection molding apparatus of claim 5, wherein said valve pin is slidable relative to said injection piston.

12. The injection molding apparatus of claim 11, wherein said valve pin is slidable through a bore in said injection piston.

* * * * *